United States Patent
He et al.

(10) Patent No.: US 11,903,008 B2
(45) Date of Patent: Feb. 13, 2024

(54) DOWNLINK RESOURCE BLANKING

(71) Applicant: QUALCOMM Incorporated, San Diego, CA (US)

(72) Inventors: Qunfeng He, San Diego, CA (US); Huilin Xu, Temecula, CA (US); Yong Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 17/399,596

(22) Filed: Aug. 11, 2021

(65) Prior Publication Data
US 2022/0053499 A1 Feb. 17, 2022

Related U.S. Application Data

(60) Provisional application No. 63/065,863, filed on Aug. 14, 2020.

(51) Int. Cl.
*H04W 72/541* (2023.01)
*H04L 27/26* (2006.01)
*H04L 5/00* (2006.01)

(52) U.S. Cl.
CPC ......... *H04W 72/541* (2023.01); *H04L 5/0048* (2013.01); *H04L 27/2607* (2013.01)

(58) Field of Classification Search
CPC ............... H04L 27/2607; H04L 5/0048; H04L 5/0053; H04W 72/541
See application file for complete search history.

(56) References Cited

U.S. PATENT DOCUMENTS

| | | | | |
|---|---|---|---|---|
| 2010/0278132 A1* | 11/2010 | Palanki | ............... | H04W 72/541 370/329 |
| 2013/0235743 A1* | 9/2013 | Goldhamer | ......... | H04W 52/243 370/252 |
| 2014/0106769 A1* | 4/2014 | Bai | ..................... | H04W 52/243 455/452.1 |
| 2015/0215940 A1* | 7/2015 | Goldhamer | ........... | H04W 24/10 370/252 |
| 2017/0332409 A1* | 11/2017 | Yerramalli | ................ | H04L 1/00 |
| 2019/0090201 A1* | 3/2019 | Akkarakaran | ...... | H04W 52/346 |
| 2019/0132023 A1* | 5/2019 | Tokgoz | .................. | H04B 1/711 |
| 2019/0379566 A1* | 12/2019 | Koyanagi | ........... | H04L 27/2628 |
| 2021/0352494 A1* | 11/2021 | Ren | ...................... | H04W 52/243 |
| 2022/0353126 A1* | 11/2022 | Cui | ...................... | H04L 5/0048 |

* cited by examiner

*Primary Examiner* — Kent Krueger
(74) *Attorney, Agent, or Firm* — Patterson & Sheridan, L.L.P.

(57) ABSTRACT

Certain aspects of the present disclosure provide techniques for downlink resource blanking. A method that may be performed by a user equipment (UE) includes receiving one or more first signals from a first cell and one or more second signals from a second cell within a sampling window, comparing a first timing of the one or more first signals with a second timing of the one or more second signals, and transmitting, to the first cell, an indication of whether to enable or disable blanking of one or more resources based on the comparison.

26 Claims, 11 Drawing Sheets

DOWNLINK RESOURCE BLANKING

CROSS-REFERENCE TO RELATED APPLICATION(S)

This application claims benefit of and priority to U.S. Provisional Application No. 63/065,863, filed Aug. 14, 2020, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for downlink resource blanking.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include desirable neighbor cell measurements, for example, with a low complexity wireless communication device.

Certain aspects of the subject matter described in this disclosure can be implemented in a method of wireless communication by a user equipment (UE). The method generally includes receiving one or more first signals from a first cell and one or more second signals from a second cell within a sampling window, comparing a first timing of the one or more first signals with a second timing of the one or more second signals, and transmitting, to the first cell, an indication of whether to enable or disable blanking of one or more resources based on the comparison.

Certain aspects of the subject matter described in this disclosure can be implemented in a method of wireless communication by a network entity. The method generally includes transmitting one or more first signals to a user equipment. The method also includes receiving, from the UE and in response to the transmission of the one or more first signals, an indication of whether to enable or disable blanking of one or more resources. The method further includes transmitting one or more second signals to the UE based on the indication.

Certain aspects of the subject matter described in this disclosure can be implemented in an apparatus for wireless communication. The apparatus generally includes a memory and a processor, which is coupled to the memory. The processor and the memory are configured to a memory; and a processor coupled to the memory, the processor and the memory being configured to: receive one or more first signals from a first cell and one or more second signals from a second cell within a sampling window, compare a first timing of the one or more first signals with a second timing of the one or more second signals, and transmit, to the first cell, a first indication of whether to enable or disable blanking of one or more resources based on the comparison.

Certain aspects of the subject matter described in this disclosure can be implemented in an apparatus for wireless communication. The apparatus generally includes a memory and a processor, which is coupled to the memory. The processor and the memory are configured to transmit one or more first signals to a UE; receive, from the UE and in response to the transmission of the one or more first signals, a first indication of whether to enable or disable blanking of one or more resources; and transmit one or more second signals to the UE based on the first indication.

Certain aspects of the subject matter described in this disclosure can be implemented in an apparatus for wireless communication. The apparatus generally includes receiving one or more first signals from a first cell and one or more second signals from a second cell within a sampling window; comparing a first timing of the one or more first signals with a second timing of the one or more second signals; and transmitting, to the first cell, a first indication of whether to enable or disable blanking of one or more resources based on the comparison.

Certain aspects of the subject matter described in this disclosure can be implemented in an apparatus for wireless communication. The apparatus generally includes means for transmitting one or more first signals to a UE; means for receiving, from the UE and in response to the transmission of the one or more first signals, a first indication of whether to enable or disable blanking of one or more resources; and means for transmitting one or more second signals to the UE based on the first indication.

Certain aspects of the subject matter described in this disclosure can be implemented in a computer-readable medium. The computer-readable medium has instructions stored thereon for receiving one or more first signals from a first cell and one or more second signals from a second cell within a sampling window; comparing a first timing of the one or more first signals with a second timing of the one or more second signals; and transmitting, to the first cell, a first indication of whether to enable or disable blanking of one or more resources based on the comparison.

Certain aspects of the subject matter described in this disclosure can be implemented in a computer-readable medium. The computer-readable medium has instructions stored thereon for transmitting one or more first signals to a UE; receiving, from the UE and in response to the transmission of the one or more first signals, a first indication of whether to enable or disable blanking of one or more resources; and transmitting one or more second signals to the UE based on the first indication.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
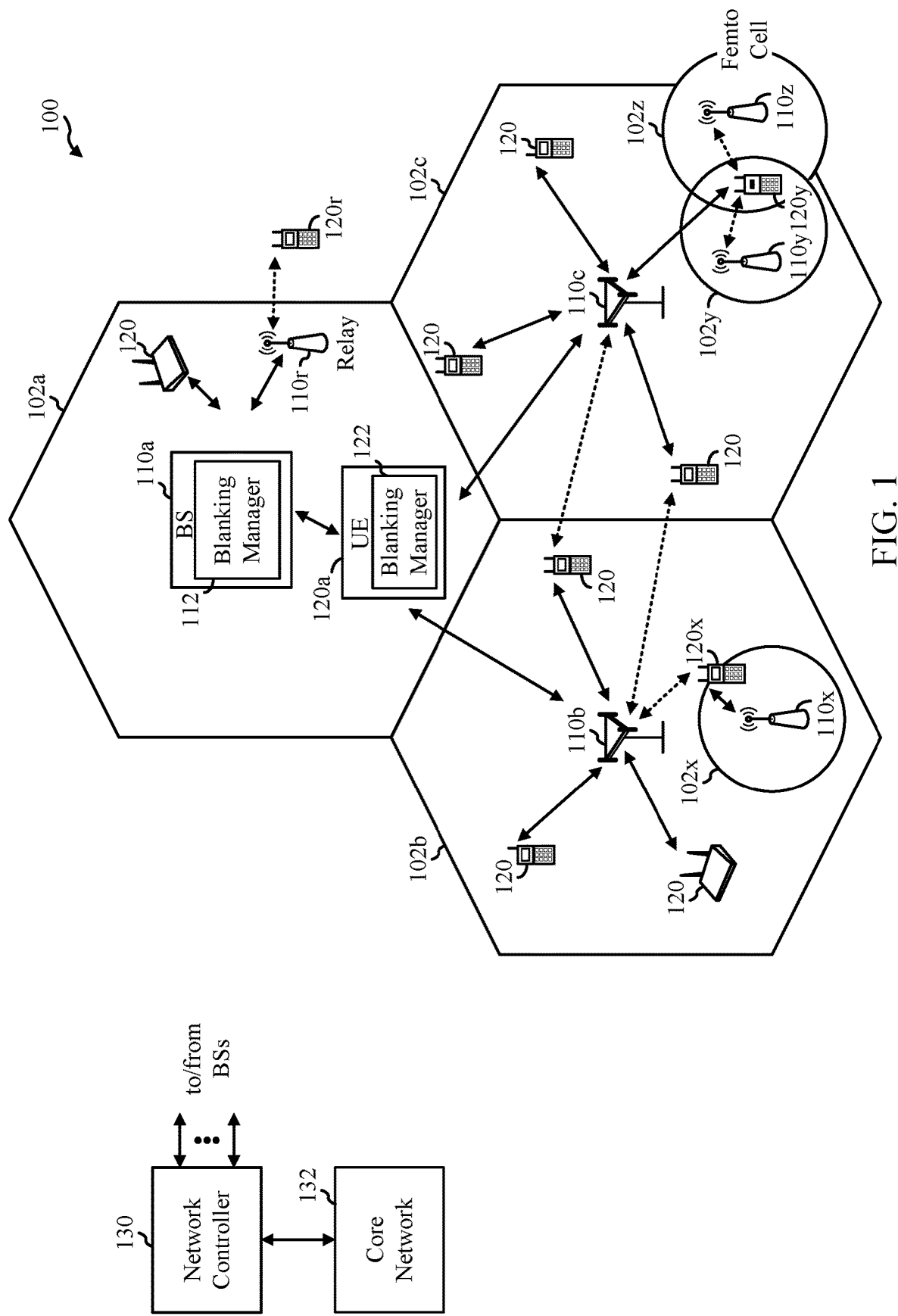
FIG. 1 is a block diagram conceptually illustrating an example wireless communication network, in accordance with certain aspects of the present disclosure.

Aspects of the present disclosure provide apparatus, methods, processing systems, and computer readable mediums for downlink resource blanking.

In certain cases, cell channel state information (CSI) reference signal (RS) measurement quality for a neighbor cell may be undesirable or degrade if any downlink slot contains both serving cell traffic and a neighbor cell CSI-RS resource to measure, and the serving cell timing is offset from the neighbor cell timing, for example, beyond half of a cyclic prefix of a symbol. A user equipment (UE) may rely on the serving cell timing to program a sample windowing and Fourier transform. In such a case, the UE may be unable to measure the CSI-RSs from the neighbor cells, or the measurements may be degraded due to the timing offset from the serving cell. On the other hand, if the sampling window is configured with the timing of the neighbor cell, the serving cell's physical downlink shared channel (PDSCH) performance may suffer instead.

A UE may indicate to a serving cell which resources from neighbor cells overlap with the downlink signaling from the serving cell, and the serving cell may blank these resources to prevent or reduce intra-frequency interference with the downlink signals from the neighbor cells. That is, the UE may provide instructions to the serving cell via uplink signaling to enable downlink resource blanking. With the serving cell implementing resource blanking, the UE may use the timing of the neighbor cell signals to sample the neighbor cell signals, and thus, provide a desirable reference signal measurement without interfering timing from the serving cell. In other words, the downlink blanking at the serving cell may enable certain UEs (e.g., low complexity UEs with a digital processing architecture as described herein with respect to FIG. 4B) to measure reference signals from neighbor cells without intra-frequency signals from a serving cell interfering with the timing of the digital sampling of the neighbor cell signals. That is, the techniques for enabling/disabling resource blanking described herein may enable certain UEs to take desirable measurements of CSI-RSs from neighbor cells without the interfering timing from the serving cell.

The following description provides examples of downlink resource blanking in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the BS 110a includes a blanking manager 112 that may blank downlink resources to the UE 120a per a request from the UE 120a, in accordance with aspects of the present disclosure. The UE 120a includes a blanking manager 122 that may request enabling or disabling of blanking downlink resources and process signals from the BSs 110a, 110b, 110c based on the timing of one of the BSs 110a, 110b, 110c depending on the state of blanking, in accordance with aspects of the present disclosure.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
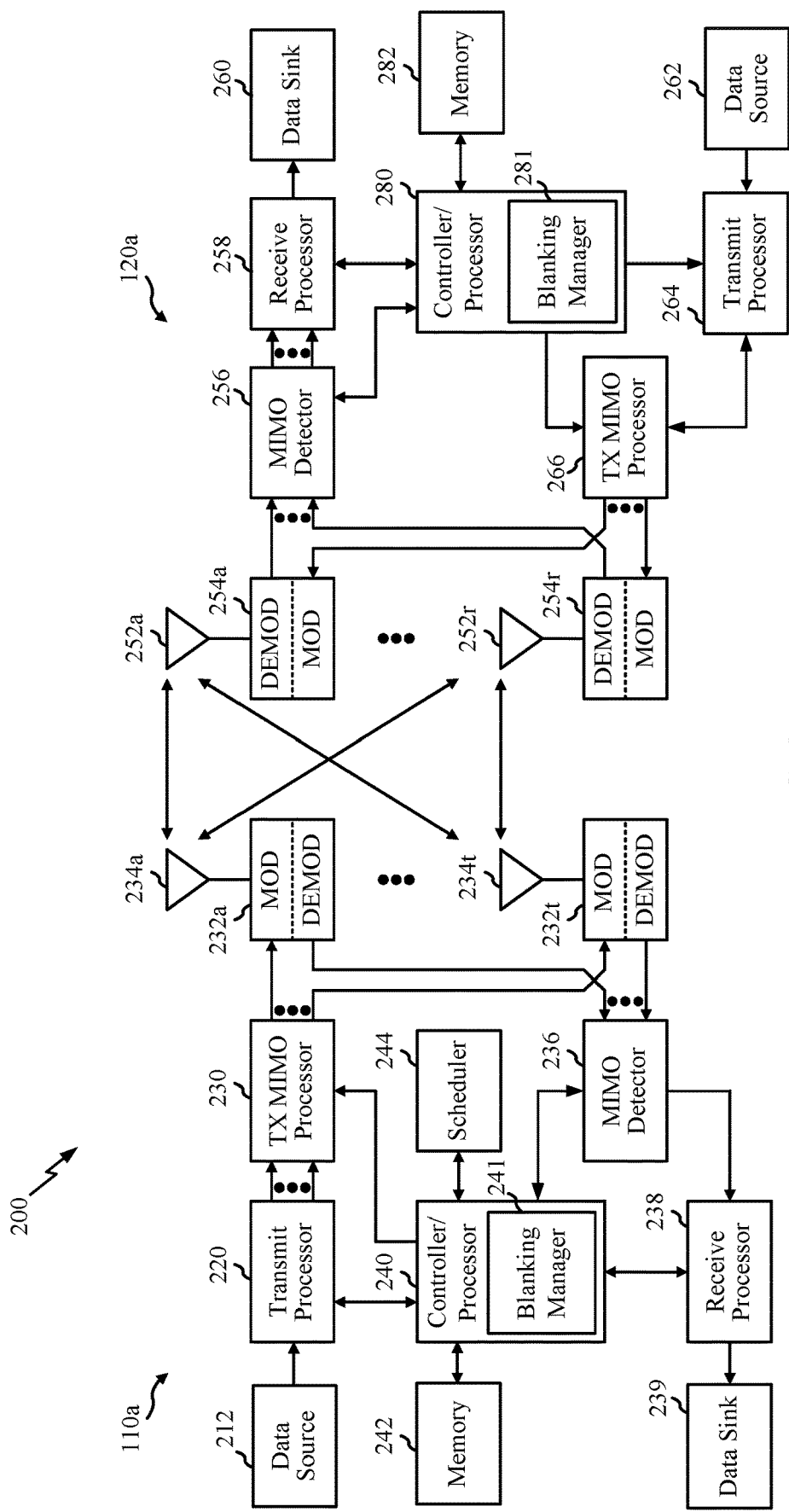
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for orthogonal frequency-division multiplexing (OFDM), etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a blanking manager 241 that may blank downlink resources to the UE 120a per a request from the UE 120a, according to aspects described herein. As shown in FIG. 2, the controller/processor 280 of the UE 120a has a blanking manager 281 that that may request enabling or disabling of blanking downlink resources and process signals from the one or more cells based on the timing of one of the cells depending on the state of blanking, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 kHz and other SCS may be defined with respect to the base SCS (e.g., 30 kHz, 60 kHz, 120 kHz, 240 kHz, etc.).

Figure 3:
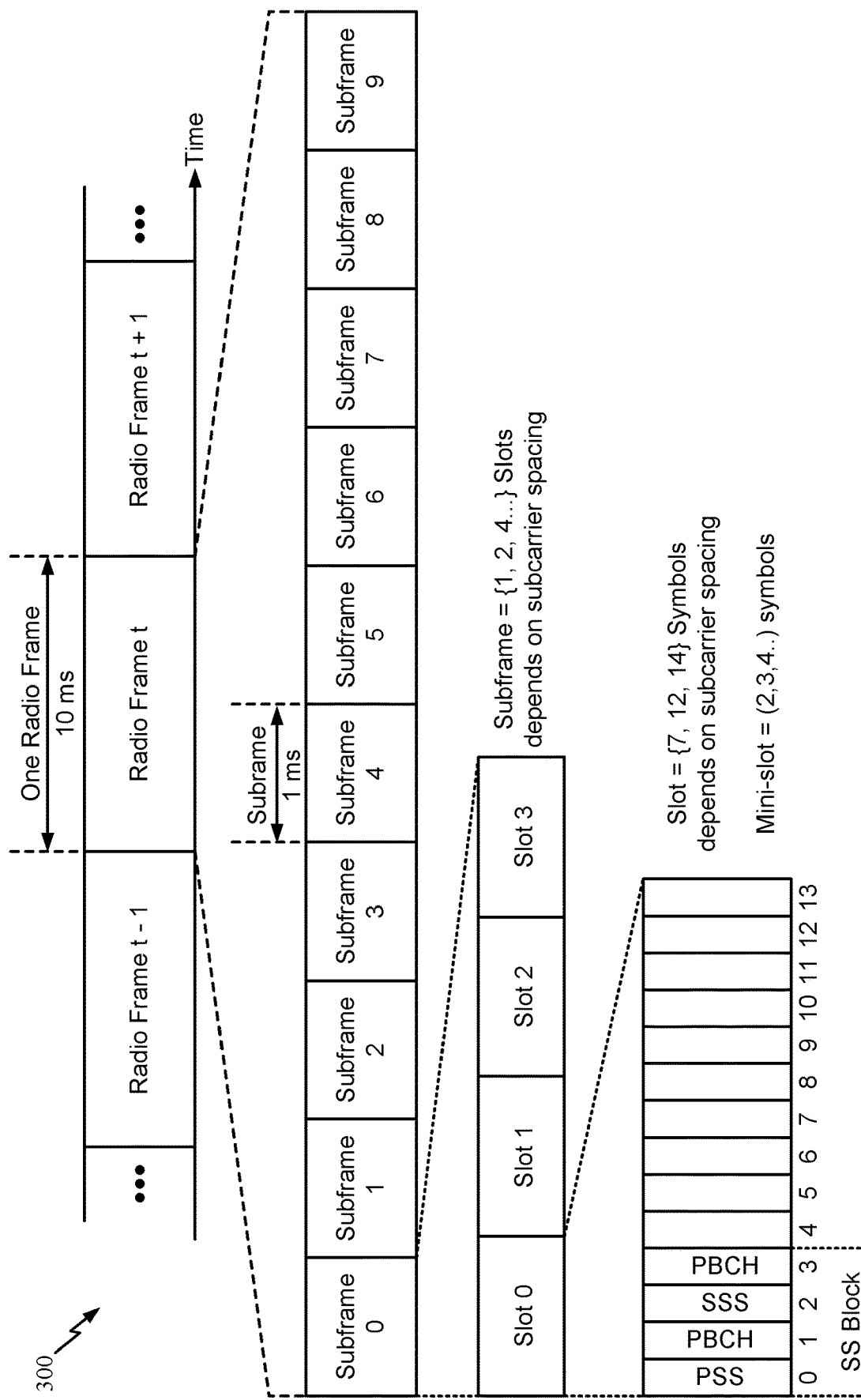
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Example Downlink Resource Blanking

In certain wireless communication systems (e.g., 5G NR systems), a certain type of reference signal (e.g., a channel state information (CSI) reference signal (RS)) may be used for radio resource management (RRM) and/or mobility control. In certain cases, the reference signal may be referred to as a Layer 3 CSI-RS (CSI-RS L3), which may be employed for RRM/mobility management, for example.

A CSI-RS L3 may be a periodic, wideband signal. In aspects, The CSI-RS L3 may have a resource configuration of which is specified via a frequency domain density (D) and number of resource blocks (RBs) given by PRB, a time domain periodicity P, slot and symbol indices, and associated $SSB_i$ of $Cell_k$ that is quasi colocated (QCLed) with $CSI-RS_j$, configured as a reference cell timing for reading the samples of CSI-RS signal. An example configuration may be D=3, PRB=48, P=20 ms, where the slot and symbol indices may be specified according to the network operator.

In a multi-cell deployment, the radio access network (RAN) may assign multiple cells to transmit a CSI-RS in a different direction to provide fine or dense coverage. The CSI-RS L3 may be used for Layer 3 measurements for mobility management such as cell level measurements. Every neighbor cell can transmit its own CSI-RS for a UE to measure. In certain cases, the serving cell and neighbor cells may transmit on the same frequency or range for frequencies (i.e., intra-frequency transmissions). If a CSI-RS is deemed as intra-frequency, the UE can measure without opening a measurement gap (MG). CSI-RS intra-frequency measurements can involve many resources from many cells, for example, up to 32 CSI-RSs transmitted by up to eight intra-frequency neighbor cells.

Figure 4A:
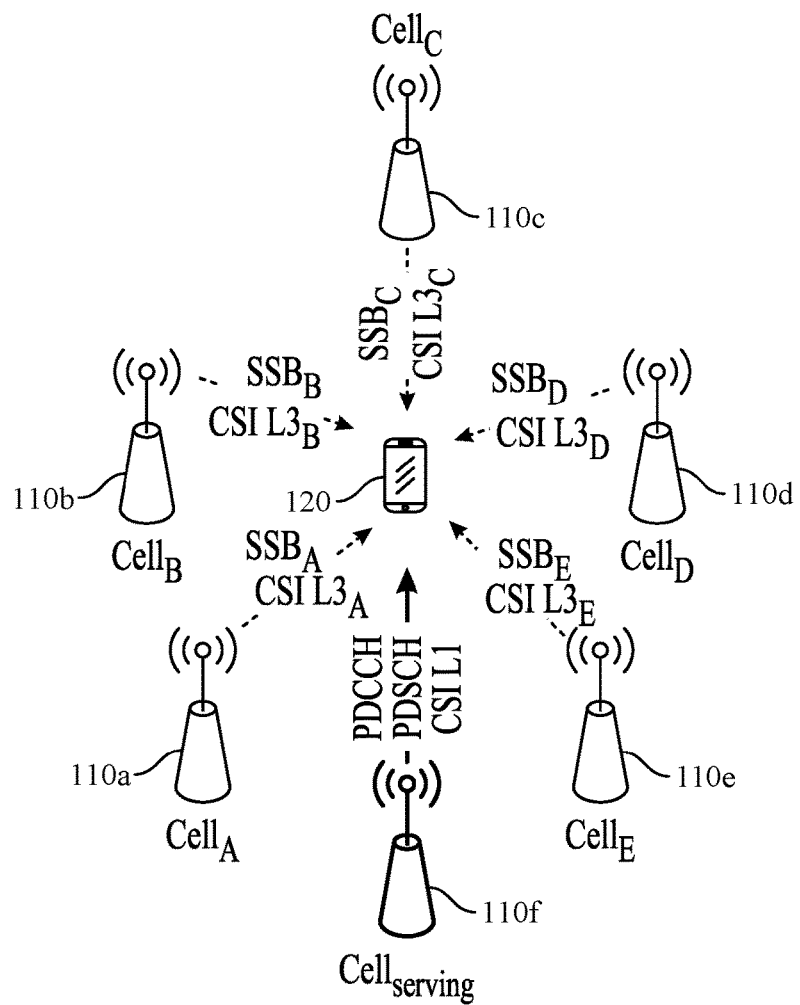
FIG. 4A is a diagram illustrating an example UE communicating with multiple cells, including a serving cell and neighbor cells, in accordance with certain aspects of the present disclosure.

In a multi-cell deployment, a UE communicates with a serving cell and monitors several neighbor cells. For example, FIG. 4A is a diagram illustrating an example UE 120 communicating with multiple cells 120a-f, including a serving cell and neighbor cells, in accordance with certain aspects of the present disclosure. In this example, the UE 120 may monitor CSI-RSs and associated SSBs from neighbor cells 110a-e, and the UE 120 may receive transmissions from a serving cell 110f. For example in 5G NR, the serving cell 110f may transmit wideband channels PDCCH/PDSCH and/or CSI-RS for Layer 1 measurements (such as channel quality indicator (CQI) or a reference signal received power (RSRP)). An SSB may be QCLed with a CSI-RS for L3 and used for detecting the neighbor cell and timing. For example, the $SSB_A$ is QCLed with CSI-RS $L3_A$, which are transmitted by the neighbor cell 110a, and the $SSB_B$ is QCLed with CSI-RS $L3_B$, which are transmitted by the neighbor cell 110b, and so on for the neighbor cells 110c-e.

Figure 4B:
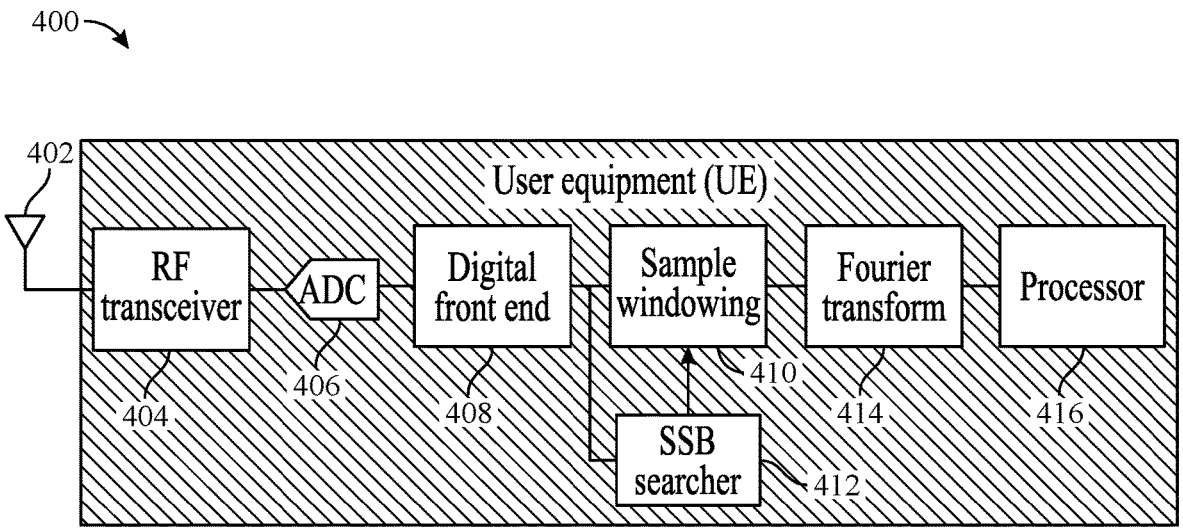
FIG. 4B is a block diagram of an example low complexity UE architecture along a receive path, in accordance with certain aspects of the present disclosure.

In a generalized low complexity architecture (e.g., machine-type communication (MTC) devices or Internet-of-Things (IoT) devices, which may be narrowband IoT (NB-IoT) devices), the UE may share certain processing resources (e.g., a sampling window, synchronization searcher, and a processor) for processing signals from the serving cell and the neighbor cell. For example, FIG. 4B is a block diagram of an example low complexity UE architecture 400 along a receive path, in accordance with certain aspects of the present disclosure. As shown, the UE architecture 400 includes an antenna 402, a radio frequency (RF) transceiver 404, an analog-to-digital converter (ADC) 406, a digital front end 408, a sampling window 410, an SSB searcher 412, a Fourier transform module 414, and a processor 416. RF signals received by the antenna 402 may be amplified and filtered with the RF transceiver 404. In certain cases, the RF transceiver 404 may convert (e.g., downconvert) the received signals to a baseband frequency using a mixer and frequency synthesizer. The ADC 406 may convert the RF signals to digital signals (e.g., in-phase (I) and quadrature (Q) digital signals) for digital processing. The digital front end 408 may perform digital down-sampling and/or channel filtering of the digital signals. The sampling window 410 may extract a portion of the digital signals for further digital processing. For example, the sampling window 410 may multiply the digital input with a rectangular window function. The SSB searcher 412 may determine the boundaries of the window function (such as a symbol boundary) for the sampling window 410 based on the timing obtained from an SSB, which may be from the serving cell or a neighbor cell. In aspects, the SSB signal may be handled separately by the SSB searcher 412. As an example, due to a cyclic prefix (CP) being at beginning portion and a copy of a sequence of data at the end portion of an OFDM symbol, there is a high correlation between the CP and the end portion of the symbol compared to other portions of the symbol. In certain cases, the SSB may be used in determining the timing boundaries (e.g., phase offsets) and/or frequency offsets. The Fourier transform module 414 may convert the samples from the sampling window 410 to the frequency domain, for example, using a Discrete Fourier Transform (DFT).

The processor 416 may be a digital signal processor (DSP), for example. In certain cases, the sampling window 410, SSB searcher 412, and the Fourier transform module 414 may be integrated with the processor 416. The processor 416 may process the serving cell signals and the neighbor cell signals in the frequency domain and/or time domain. The processor 416 may measure the CSI-RSs from the neighbor cells. For example, the serving cell signals (e.g., PDSCH/PDCCH/CSI-RS for L1) and the neighbor cell CSI-RS signal for L3 may be processed from the same sampling window 410 by the same processor 416. That is, the UE may use the same signal processing path as the serving cell channels/signals for intra-frequency CSI-RS measurements for neighbor cells. Expressed another way, the neighbor cell measurements may share a majority of the data path with serving cell signals, for example, with regard to the sample windowing 410 and Fourier Transform module 414.

In certain cases, neighbor cell CSI-RS L3 measurement quality may be undesirable or degrade if any DL slot contains both serving cell traffic and neighbor cell CSI-RS L3 resource to measure, and the serving cell timing is offset from the neighbor cell timing, for example, beyond half of a CP of a symbol. The UE may rely on the serving cell timing to program the sample windowing 410 and Fourier transform module 414. In such a case, the processor 416 may be unable to measure the CSI-RSs from the neighbor cells, or the measurements may be degraded due to the timing offset from the serving cell. On the other hand, if the sampling window is configured with the timing of the neighbor cell, the serving cell's PDSCH channel performance may suffer instead.

Aspects of the present disclosure provide a technique for enabling or disabling downlink resource blanking (muting or puncturing) at a serving cell. For example, the UE may indicate to the serving cell which resources from the neighbor cells overlap with the downlink signaling from the serving cell, and the serving cell may blank these resources to prevent or reduce intra-frequency interference with the downlink signals from the neighbor cells. That is, the UE may provide instructions to the serving cell via uplink signaling to enable downlink resource blanking. With the serving cell implementing resource blanking, the UE may use the timing of the neighbor cell signals to sample the neighbor cell signals, and thus, provide a desirable CSI-RS measurement without interfering timing from the serving cell. In other words, the downlink blanking at the serving cell may enable certain UEs (e.g., low complexity UEs with a digital processing architecture as described herein with respect to FIG. 4B) to measure CSI-RSs from neighbor cells without intra-frequency signals from a serving cell interfering with the timing of the digital sampling of the neighbor cell signals. That is, certain UEs may be able to take desirable measurements of CSI-RSs from neighbor cells without the interfering timing from the serving cell.

To determine whether to enable or disable downlink resource blanking, the UE may compare the timing of the serving cell signals with the timing of the neighbor cell signals. For example, the UE may estimate the timing of the serving cell and the timing of the neighbor cell as $\{T_{cellserv}, T_A, T_B \ldots \}$ given the associated SSBs from the various cells. The UE may determine the proper timing $T_j$ for every CSI-RS resource j and compare the timing of the serving cell ($T_{cellserv}$) with the timing of the neighbor cell ($T_j$). If the timing of the serving ($T_{cellserv}$) is close to the timing of the neighbor cell ($T_j$) (for example, if abs($T_{cellserv}-T_j$)≤threshold), the serving cell timing may be used to configure the sampling windowing and Fourier transform. In certain cases, the threshold may be half of a CP of an OFDM symbol. If the timing of the serving ($T_{cellserv}$) is offset from the timing of the neighbor cell ($T_j$) (for example, if abs($T_{cellserv}-T_j$) ≥threshold), the UE may indicate via the uplink signaling (e.g., carried over PUCCH or PUSCH) to the serving cell to blank the serving cell's corresponding downlink resources (e.g., time-domain and frequency-domain resources).

In certain aspects, the UE may assume the serving cell enables the symbol blanking, and the UE may employ the chosen neighbor cell timing for measuring the CSI-RS from that neighbor cell. If the UE detects that the timing of the serving ($T_{cellserv}$) is close to the timing of the neighbor cell ($T_j$), the UE may indicate via uplink signaling (e.g., carried over PUCCH or PUSCH) to the serving cell to disable the downlink resource blanking dynamically. With the timing between the serving cell and neighbor cell closely aligned, the UE may employ the timing of the serving cell for processing signals from the serving cell and measuring CSI-RS from the neighbor cell without degradation of the CSI-RS measurements.

Figure 5:
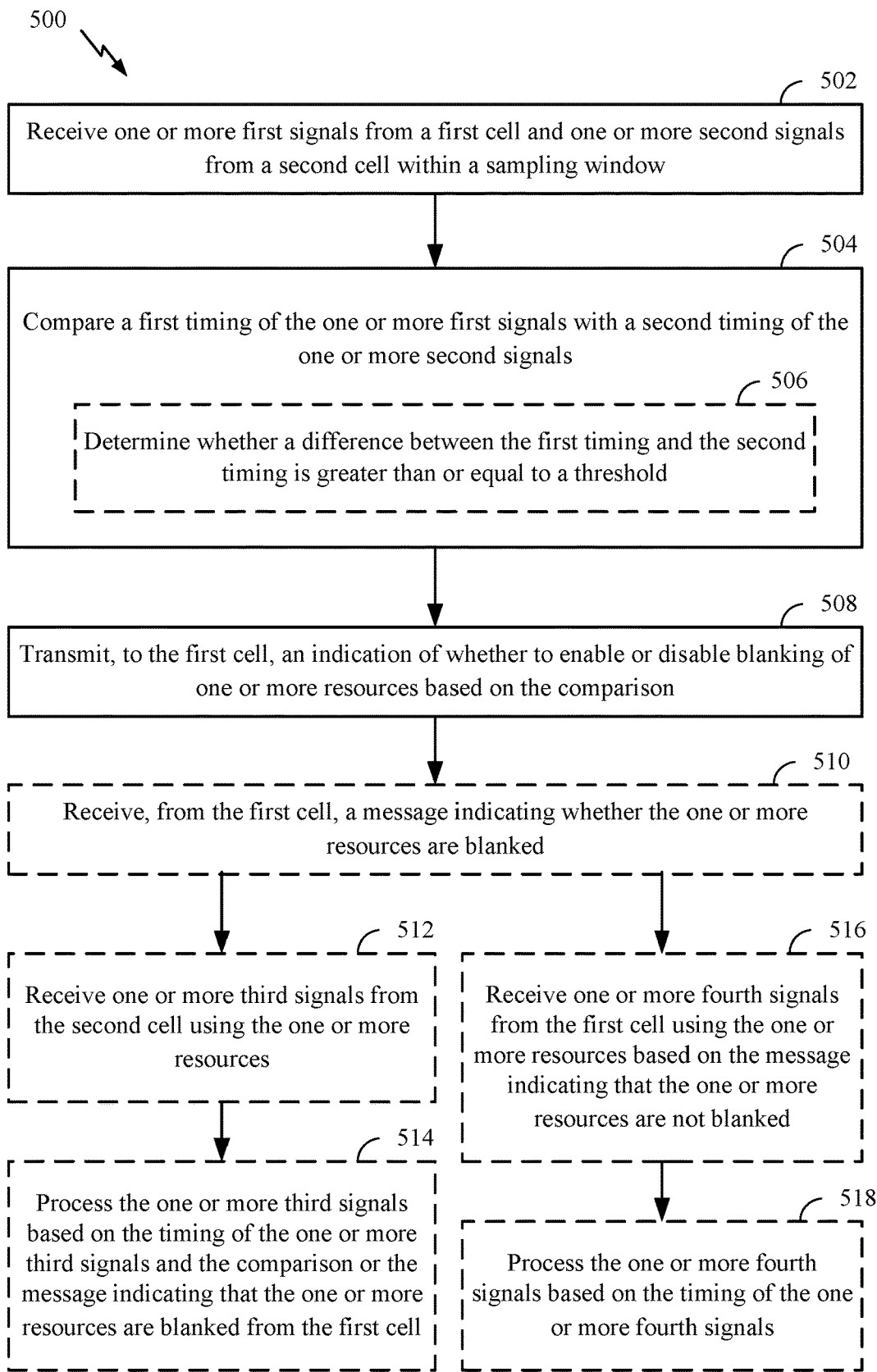
FIG. 5 is a flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. The operations 500 may be performed, for example, by a UE (e.g., the UE 120a in the wireless communication network 100). The operations 500 may be implemented as software components that are executed and run on one or more processors (e.g., controller/processor 280 of FIG. 2). Further, the transmission and reception of signals by the UE in the operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals. In certain cases, the UE may be a low complexity UE, for example, having a receive path architecture as described herein with respect to FIG. 4B.

The operations 500 may begin at block 502, where the UE may receive one or more first signals (e.g., PDCCH, PDSCH, and/or RSs) from a first cell (e.g., the serving cell 110f) and one or more second signals (e.g., CSI-RS and/or SSB) from a second cell (e.g., the neighbor cell 110a) within a sampling window (e.g., the sampling window 410). At block 504, the UE 120 may compare a first timing of the one or more first signals with a second timing of the one or more second signals. In certain aspects, the comparison at block 504 may include determining, at block 506, whether a difference between the first timing and the second timing is greater than or equal to a threshold. At block 508, the UE may transmit, to the first cell, an indication (e.g., a first indication) of whether to enable or disable blanking of one or more resources (e.g., time-domain and/or frequency-domain resources such as the symbol(s) 812, 814, 816 of FIG. 8C) based on the comparison at block 504.

In certain cases, the comparison at block 504 may include determining that the difference between the first timing and the second timing is greater than or equal to the threshold, and the indication (e.g., the first indication), at block 508, indicates to enable blanking of the one or more resources.

In certain aspects, at block 510, the UE may receive, from the first cell, a message indicating whether the one or more resources are blanked, for example, in cases, where the indication, at block 508, indicates to enable blanking of the one or more resources. That is, the message from the first cell may indicate whether blanking on the one or more resources is disabled or enabled. In certain cases, the message from the first cell may be sent via various downlink control signaling such as radio resource control (RRC) signaling, downlink control information (DCI), or medium access control (MAC) signaling (e.g., a MAC control element (MAC-CE)). In certain aspects, the message at block 606 may indicate which resources are blanked, for example, in cases where additional resources (such as resources adjacent to the one or more resources) are blanked.

At block 512, the UE may receive one or more third signals from the second cell using the one or more resources. Because the serving cell has blanking enabled, the UE may not receive any signals from the serving cell via the one or more resources, and thus, enabling the UE to measure the CSI-RS from the second cell without interfering timing from the serving cell. For example, as indicated by the message at block 510 or under the assumption that the serving cell has enabled blanking without the message, at block 514, the UE may process the one or more third signals based on the timing of the one or more third signals and the comparison or the message indicating that the one or more resources are blanked from the first cell. That is, the timing of the one or more third signals, which may be derived from the SSB from the second cell, may be used to configure the sampling window based on the assumption that blanking of the one or more resources is enabled (e.g., based on the result of the comparison at block 504) and/or based on the message at block 510. Processing the one or more third signals at block 514 may involve performing measurements of the CSI-RSs from the second cell.

In certain aspects, the message at block 510 may indicate that blanking of the one or more resources is not enabled at the serving cell. In such a case, the UE may adopt the serving cell timing ($T_{cellserv}$) for prioritizing the serving cell downlink channel processing and/or CSI-RS measurement. At block 516, the UE may receive one or more fourth signals from the first cell using the one or more resources based on the message indicating that the one or more resources are not blanked. In certain cases, the UE may also receive signals from the second cell, but the UE may filter out these signals or attempt to perform the CSI-RS measurements with the timing offset. At block 518, the UE may process the one or more fourth signals based on the timing of the one or more fourth signals, which may be derived from the SSB from the first cell. For example, the UE may use the SSB from the first cell to configure the sampling window.

In aspects, the difference at block 506 may be the absolute value of the difference between the first timing and the second timing. In certain cases, the threshold is half of a cyclic prefix of an OFDM symbol. The comparison at block 504 may include determining that the difference between the first timing and the second timing is less than or equal to the threshold, and the indication, at block 508, indicates to disable blanking of the one or more resources. After determining that the timing of the first cell is close to the timing of the second cell, the UE may process the one or more second signals based on the first timing of the one or more first signals. For example, the SSB of the first cell may be used to configure the sampling window to process the signals from second cell.

In certain aspects, the UE may transmit the indication at block 508 via the PUSCH and/or the PUCCH. The indication at block 508 may be sent via uplink control information (UCI), MAC-CE, and/or RRC signaling. The indication at block 508 may include an indication (e.g., a second indication) of the one or more resources and a flag indicating whether to enable or disable blanking of the serving cell channels over the time-domain resource units (e.g., symbols) that the one or more resources dwell (e.g., overlapping or adjacent resources to the neighbor cell resources). The indication of the one or more resources (e.g., the second indication) may be an integer that indicates a set of CSI-RS resources by a measurement object identifier (e.g., the MeasObjectId information element, which is used to identify a measurement object configuration). In certain aspects, the indication of the one or more resources may include identifiers of separate CSI-RS resources. That is, the indication of the one or more resources may include an identifier corresponding to a plurality of resources (e.g., MeasObjectId) and/or a plurality of identifiers corresponding to separate resources (e.g., a CSI-RS Resource Identifier or SSB index).

The flag may be a Boolean that indicates whether to enable or disable blanking of the serving cell over the symbols with one or more configured CSI-RS resources of the neighbor cells. For example, a value of true or '1' may indicate to enable blanking, whereas a value of false or '0' may indicate to disable blanking.

As an example, the indication may have the following format:

```
MOBlankReq ::= SEQUENCE {
    MeasObjectId INTEGER //select a set of CSI-RS resources as
    indicated by the measurement object ID,
    EnableBlanking Boolean // enable or disable the blanking
}
``` where the MOBlankReq refers to a measurement object blanking request, the MeasObjectId is an RRC information element used to identify a measurement object configuration, and the EnableBlanking is the flag indicating whether to enable or disable blanking of the resources corresponding to the MeasObjectId.

In aspects, the one or more resources may correspond to reference signal resources (e.g., CSI-RS resources) of one or more neighbor cells. The network entity may map the reference signal resources of the neighbor cells to the resources for blanking. For example, the one or more resources may overlap with or be adjacent to at least one of one or more time-domain resources (e.g., symbols, slots, subframes, etc.) or one or more frequency-domain resources (e.g., a carrier bandwidth part) associated with a reference signal (e.g., a CSI-RS and/or SSB) of the second cell, for example, as described herein with respect to FIG. 8C.

Figure 6:
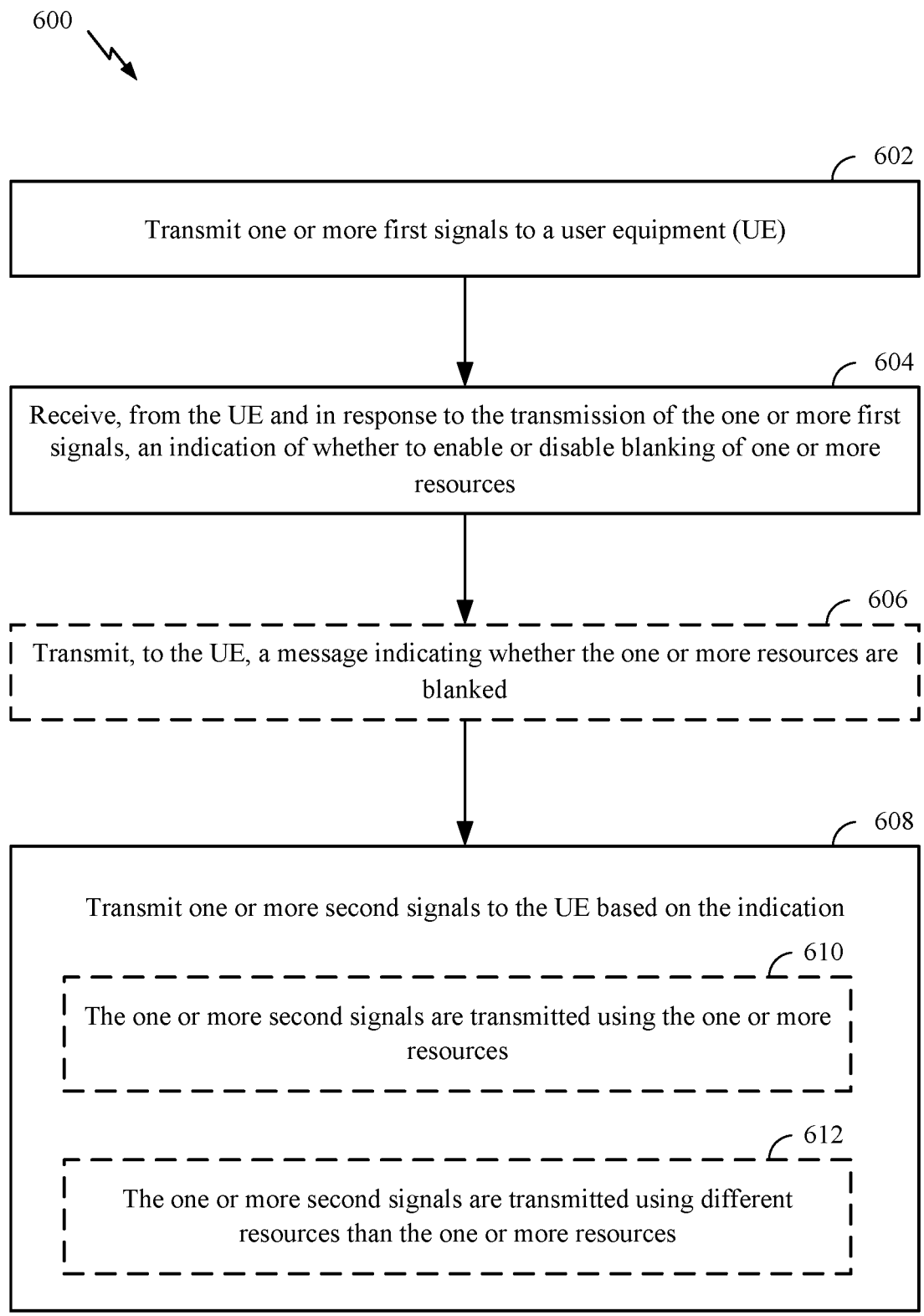
FIG. 6 is a flow diagram illustrating example operations for wireless communication by a network entity, in accordance with certain aspects of the present disclosure.

FIG. 6 is a flow diagram illustrating example operations 600 for wireless communication, in accordance with certain aspects of the present disclosure. The operations 600 may be performed, for example, by a network entity (e.g., the BS 110a in the wireless communication network 100). The operations 600 may be complimentary to the operations 500 performed by the UE. The operations 600 may be implemented as software components that are executed and run on one or more processors (e.g., controller/processor 240 of FIG. 2). Further, the transmission and reception of signals by the network entity in the operations 600 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals. In certain cases, the network entity may be a serving cell of a UE, such as the UE 120 of FIG. 4A.

The operations 600 may begin at block 602, where the network entity may transmit one or more first signals to a user equipment (e.g., the UE 120a). At block 604, the network entity may receive, from the UE and in response to the transmission of the one or more first signals, an indication (e.g., a first indication) of whether to enable or disable blanking of one or more resources (e.g., the symbol(s) 812, 814, 816 of FIG. 8C). Optionally, at block 606, the network entity may transmit, to the UE, a message indicating whether the one or more resources are blanked. For example, the message at block 606 may indicate whether certain symbols that carry the one or more resources are blanked. At block 608, the network entity may transmit one or more second signals to the UE based on the indication. As an example, at block 610, the one or more second signals may be transmitted using the one or more resources, for example, in cases where the indication, at block 604, indicates to disable blanking of the serving cell symbols that provide the one or more resources of the neighbor cells. In certain cases, at block 612, the one or more second signals may be transmitted using different resources than the one or more resources, for example, in cases where the indication, at block 604, indicates to enable blanking of the one or more resources. In aspects, at block 612, the one or more second signals may be transmitted using different time-domain resources than the one or more resources, but the same frequency-domain resources as the one or more resources.

As used herein, blanking of resources may refer to a network entity (e.g., a serving cell) refraining from transmitting at certain time-domain resources (e.g., symbols, slots, subframes, etc.) and at certain frequency-domain resources (e.g., the same frequencies as the CSI-RS resources of a neighbor cell such as a bandwidth part of the CSI-RS resources). When blanking resources, the serving cell may skip transmitting certain resources over which one or more resources of neighbor cells are shared between the serving cell and neighbor cells. For example, when blanking resources, the serving cell may skip transmitting certain resources that overlap with or are adjacent to reference signal resources of neighbor cells.

In aspects, the message at block 606 may be sent via various downlink control signaling such as RRC signaling, downlink DCI, or MAC signaling. In certain cases, the network entity may determine not to implement resource blanking even though the indication, at block 604, indicates to enable resource blanking. In such cases, the message at block 606 may indicate that the symbols of one or more resources are not blanked. In certain cases, the network entity may determine to implement resource blanking. In such cases, the message at block 606 may indicate that the symbols of one or more resources are blanked. In certain aspects, the message at block 606 may indicate which resources are blanked, for example, in cases where additional resources (such as resources adjacent to the one or more resources) are blanked.

The indication at block 604 may correspond to the indication at block 508 of the operations 500. That is, the indication at block 604 may include an indication of the one or more resources (e.g., a second indication) and a flag indicating whether to enable or disable blanking of the one or more resources, as described herein with respect to the operations 500.

In aspects, the one or more resources may correspond to reference signal resources (e.g., CSI-RS resources) of a neighbor cell. As described herein, the indication of the one or more resources may include an indication of reference signal resources of a neighbor cell. That is, the one or more resources for which blanking is enabled or disabled may be indicated by the reference signal resources of a neighbor cell, and the network entity may translate (or map) the reference signal resources to the resources enabled or disabled for blanking. For example, the network entity may identify the one or more resources that overlap with or are adjacent to the reference signal resources of the neighbor cell, and the identified resources may represent the resources for blanking. In certain aspects, the one or more resources may overlap with or be adjacent to at least one of one or more time-domain resources (e.g., symbols, slots, subframes, etc.) or one or more frequency-domain resources (e.g., a carrier bandwidth part) associated with a reference signal (e.g., a CSI-RS and/or SSB) of a second cell.

In aspects, the signals transmitted by the network entity may be control signals, data signals, and/or reference signals. For example, the one or more first signals or the one or more second signals may include one or more downlink control signals (e.g., PDCCH), one or more downlink data signals (e.g., PDSCH), or one or more reference signals (e.g., CSI-RS and/or SSB).

Figure 7:
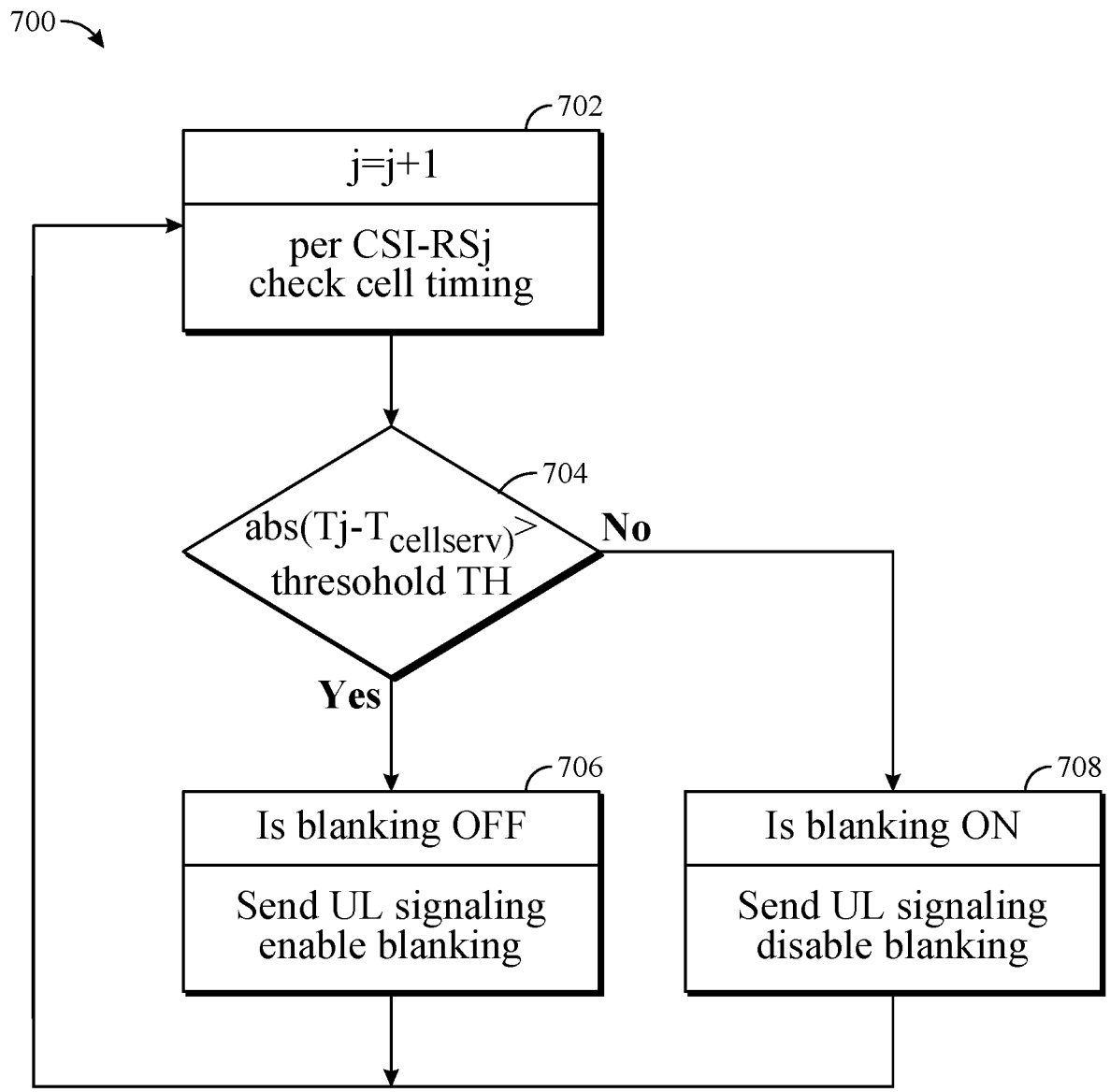
FIG. 7 is a flow diagram illustrating example operations for comparing the timing of a serving cell with the timing of a neighbor cell, in accordance with certain aspects of the present disclosure.

FIG. 7 is a flow diagram illustrating example operations 700 for comparing the timing of a serving cell (e.g., the serving cell 110f) with the timing of a neighbor cell (e.g., the neighbor cell 110a), in accordance with certain aspects of the present disclosure. At block 702, the UE may detect the timing for one or more CSI-RS resources (CSI-RS$_j$) of neighbor cells. As an example, the UE may detect the timing for each of the CSI-RSs received from the neighbor cells. In certain cases, the UE may detect the timing using the SSBs associated with CSI-RSs (e.g., QCLed) received from the neighbor cells. The timing of a neighbor cell may be obtained by mapping based on SSB associated with the CSI-RS and the cell identifier. In certain aspects, the cell timing estimator may refresh the timing of every detected cell including the timing of the serving cell ($T_{cellserv}$). At block 704, the UE may compare the timing of the serving cell with the timing of the neighbor cells. For example, the UE may compare each difference between the timing of the serving cell and the timing of the neighbor cells with a threshold as provided by the following expression:

$$\text{abs}(T_j - T_{cellserv}) \geq \text{TH} \quad (1)$$

where Tj is the timing for a neighbor cell among N neighbor cells, $T_{cellserv}$ is the timing of the serving cell, and TH is the threshold such as CP/2. At block 706, if the timing difference is greater than or equal to the threshold and blanking is disabled, the UE may request the serving cell to enable blanking of serving cell transmission over symbols of one or more resources (such as the resources corresponding to the CSI-RSs of one or more neighbor cells). For example, the UE may send the indication to the serving cell as described herein with respect to FIG. 5. At block 708, if the timing difference is less than or equal to the threshold and blanking is enabled, the UE may request the serving cell to disable the serving cell blanking over symbols with one or more resources of neighbor cells. For example, the UE may send the indication to the serving cell as described herein with respect to FIG. 5. The UE may continue to monitor the timing of the neighbor cells with respect to the timing of the serving cell. As an example, if blanking is enabled and the timing of a neighbor cells shifts within the threshold, the UE may request the serving cell to disable blanking. Alternatively, if blanking is disabled and the timing of a neighbor cells shifts beyond the threshold, the UE may request the serving cell to enable blanking.

In aspects, the dynamic symbol blanking operations performed by the UE may have a cell timing estimator, a neighbor CSI-RS measurement processor (which may be implemented by the processor 416), a CSI timing checker, an uplink signaling encoder, and a downlink signaling decoder. The cell timing estimator may estimate the cell timing based on the SSBs associated with the CSI-RSs, for example, as described herein with respect to the SSB searcher 412. The neighbor CSI-RS measurement processor measures the RSRP of the CSI-RS resource based on the timing enabled for the state of the blanking (e.g., based on the serving cell timing if blanking is disabled or based on the neighbor cell timing if blanking is enabled). The CSI timing checker may recognize the time difference among cells and trigger the request to enable or disable blanking. The uplink signaling encoder may indicate the blanking request to the network per CSI-RS resource. The downlink signaling decoder may indicate whether a current time-domain resource unit (e.g., a slot) is blanked or has blanked sub-resources (e.g., symbols) that may overlap with the neighbor cell.

Figure 8A:
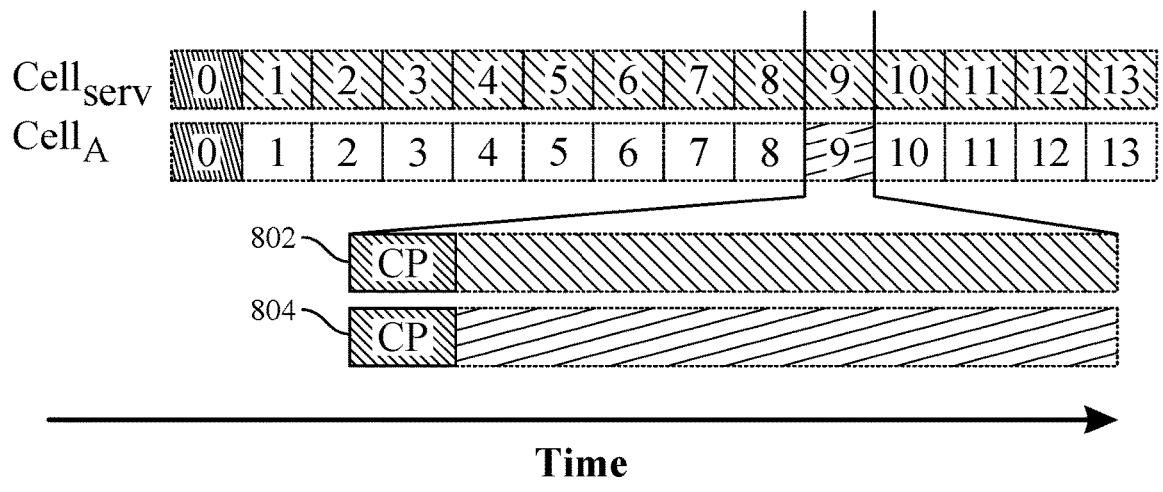
FIG. 8A is a diagram of aligned slot boundaries of a serving cell and a neighbor cell, in accordance with certain aspects of the present disclosure.

FIG. 8A is a diagram of aligned slot boundaries of a serving cell and a neighbor cell, in accordance with certain aspects of the present disclosure. As shown, the boundaries of the symbols within the slot of the serving cell (Cell$_{serv}$) are aligned with the boundaries of the symbols of the slot of the neighbor cell (Cell$_A$). For example, the boundaries of the symbol 802 of the serving cell are aligned with the boundaries of the symbol 804 of the neighbor cell. In this example, with the timing boundaries aligned between the serving cell and the neighbor cell, the UE may use the timing of the serving cell to process the signals from the serving cell and the neighbor cell. In cases where blanking is enabled, the UE may request that the serving cell to disable blanking, for example, at the symbol 802 and/or the symbol 804 (e.g., the tenth symbol in the slot). As used herein, the timing of signals may refer to the timing boundaries of various time-domain resource units (e.g., subframe, slot, symbols, etc.) that carry the signals. For example, the timing of the signals received from the serving cell may include the timing boundaries of the symbol 802, and the timing of the signals received from the neighbor cell may include the timing boundaries of the symbol 804.

Figure 8B:
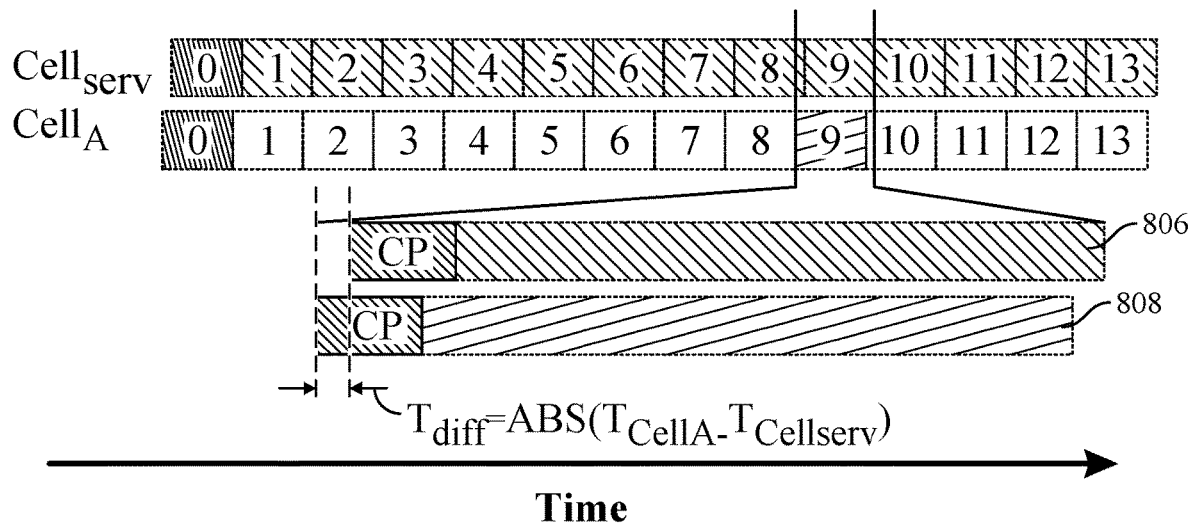
FIG. 8B is a diagram of an example of offset slot boundaries of a serving cell and a neighbor cell, in accordance with certain aspects of the present disclosure.

FIG. 8B is a diagram of an example of offset slot boundaries of a serving cell and a neighbor cell, in accordance with certain aspects of the present disclosure. As shown, the boundaries of the symbols within the slot of the serving cell (Cell$_{serv}$) are offset from the boundaries of the symbols within the slot of the neighbor cell (Cell$_A$). Due to cell synchronization, planning etc., the serving cell and the neighbor cell can have different timings. For example, the beginning boundary of the symbol 806 of the serving cell is offset from the beginning boundary of the symbol 808 of the neighbor cell by a certain timing difference (T$_{diff}$). In other words, the slot (or symbol) boundary of the neighbor cell is leading the slot (or symbol) boundary of the serving cell by the timing difference (T$_{diff}$). In other cases, the timing boundary of the serving cell may be leading the timing boundary of the neighbor cell. If T$_{diff}$ is greater than or equal to a threshold (e.g., CP/2), the UE may request the serving cell to enable blanking, for example, at the symbol 808 or adjacent symbols to the symbol 808 within the slot of the serving cell, as further described herein with respect to FIG. 8C. If T$_{diff}$ is less than or equal to the threshold, the UE may request the serving cell to disable blanking, for example, at the symbol 808.

Figure 8C:
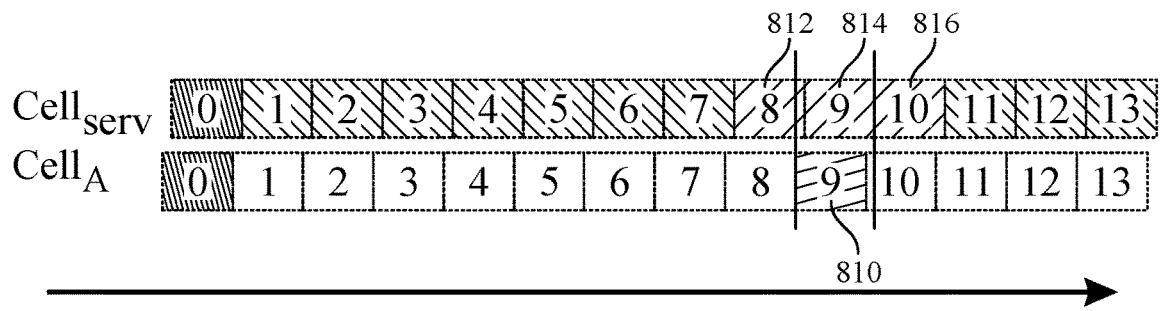
FIG. 8C is a diagram of an example of blanking resources of a serving cell in a slot when the slot boundaries of the serving cell and the neighbor cell are offset, in accordance with certain aspects of the present disclosure.

FIG. 8C is a diagram of an example of blanking resources of a serving cell in a slot when the slot boundaries of the serving cell and the neighbor cell are offset, in accordance with certain aspects of the present disclosure. In this example, suppose the UE requests that the serving cell blank resources at the symbol 810 of the slot of the neighbor cell. The serving cell may identify one or more resources, which overlap with or are adjacent to the symbol 810, in which to blank. For example, the serving cell may identify the symbols 812, 814, 816 as overlapping or adjacent resources to the symbol 810 of the neighbor cell in which to blank. The serving cell may blank the symbols 812, 814, 816 to enable the UE to successfully measure the reference signals from the neighbor cell at the symbol 810. In certain aspects, the serving cell may only blank overlapping resources without blanking adjacent resources, such as the symbol 816. In aspects, an adjacent resource may refer to a serving cell resource (e.g., symbol 816) that is adjacent to another serving cell resource (e.g., symbol 814), which overlaps with a neighbor cell resource (e.g., symbol 810).

Figure 9:
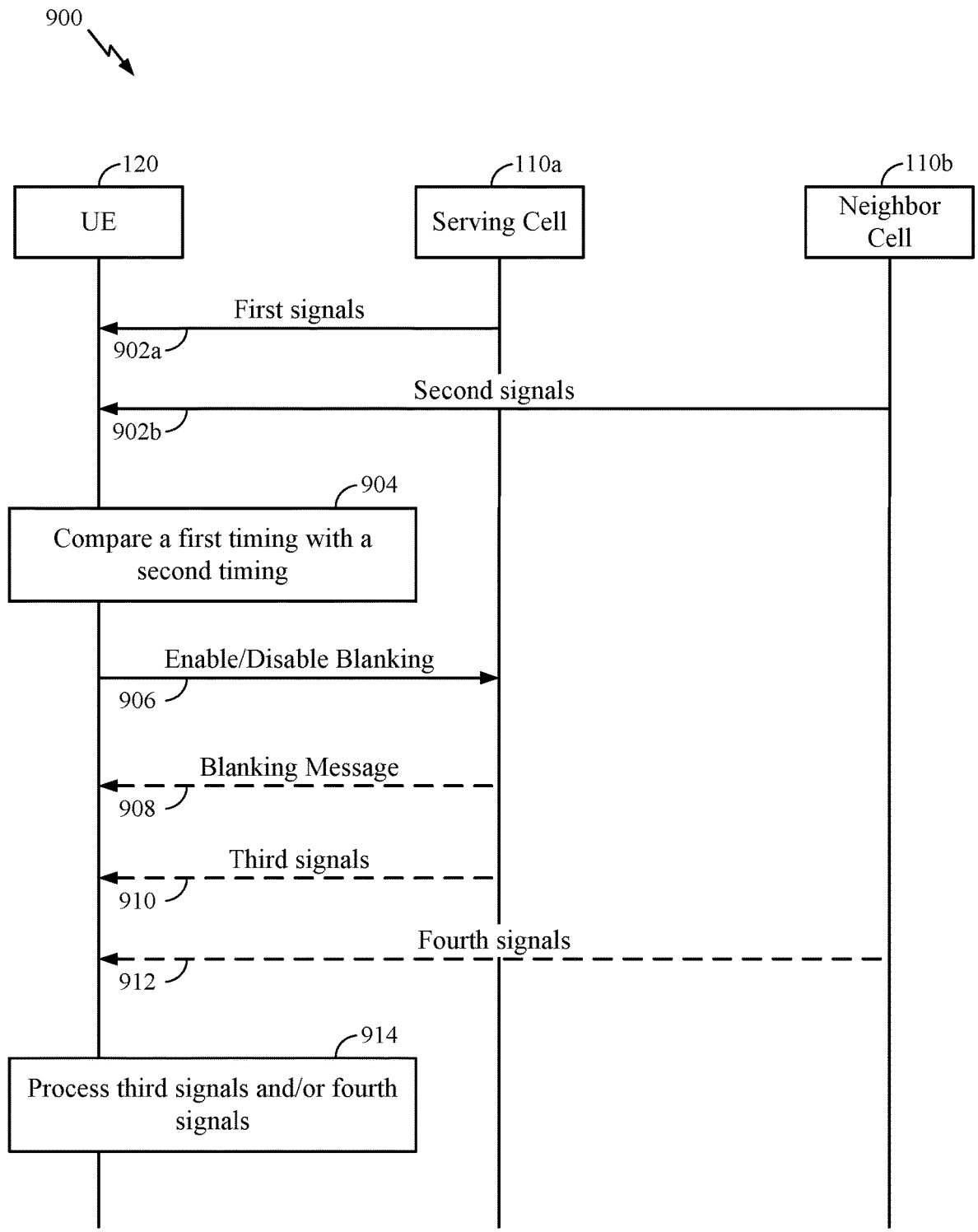
FIG. 9 is a signaling flow diagram illustrating example operations for downlink resource blanking, in accordance with aspects of the present disclosure.

FIG. 9 is a signaling flow of example operations for downlink resource blanking, in accordance with certain aspects of the present disclosure. As shown, the UE 120 receives first signals 902a from the serving cell 110a and second signals 902b from the neighbor cell 110b within a sampling window and at the same frequency. That is, the UE 120 may receive the first signals 902a and the second signals 902b concurrently, where the second signals 902a are intra-frequency with the first signals 902a. In aspects, the first signals 902a may be control, data, or reference signals (e.g., PDCCH, PDSCH, or RSs) from the serving cell, and the second signals 902b may be CSI-RSs and/or SSBs from the neighbor cell 110b. At 904, the UE may compare the first timing of the first signals with the second timing of the second signals, for example, as described herein with respect to FIGS. 5 and 7. The UE may transmit, to the serving cell 110a, an indication 906 of whether to enable or disable blanking of one or more resources (such as resources corresponding to the CSI-RS received with the second signals 902b) based on the comparison at 904. Optionally, the serving cell 110a may transmit, to the UE, a message 908 indicating whether the blanking of the one or more resources is enabled.

The UE may receive third signals 910 from the serving cell 110a and fourth signals 912 from the neighbor cell 110b. In certain cases, the serving cell 110a may implement blanking of the one or more resources for the third signals 910. That is, the serving cell 110a may refrain from transmitting on the resources identified for blanking, for example, as described herein with respect to FIG. 8C. In certain cases, the serving cell 110a may not perform blanking of the one or more resources for the third signals 910. At 914, the UE 120 may process the third signals 910 and/or the fourth signals 912 based on the timing of the third signals 910 or the fourth signals 912, depending on whether blanking is enabled for the third signals 910.

Figure 10:
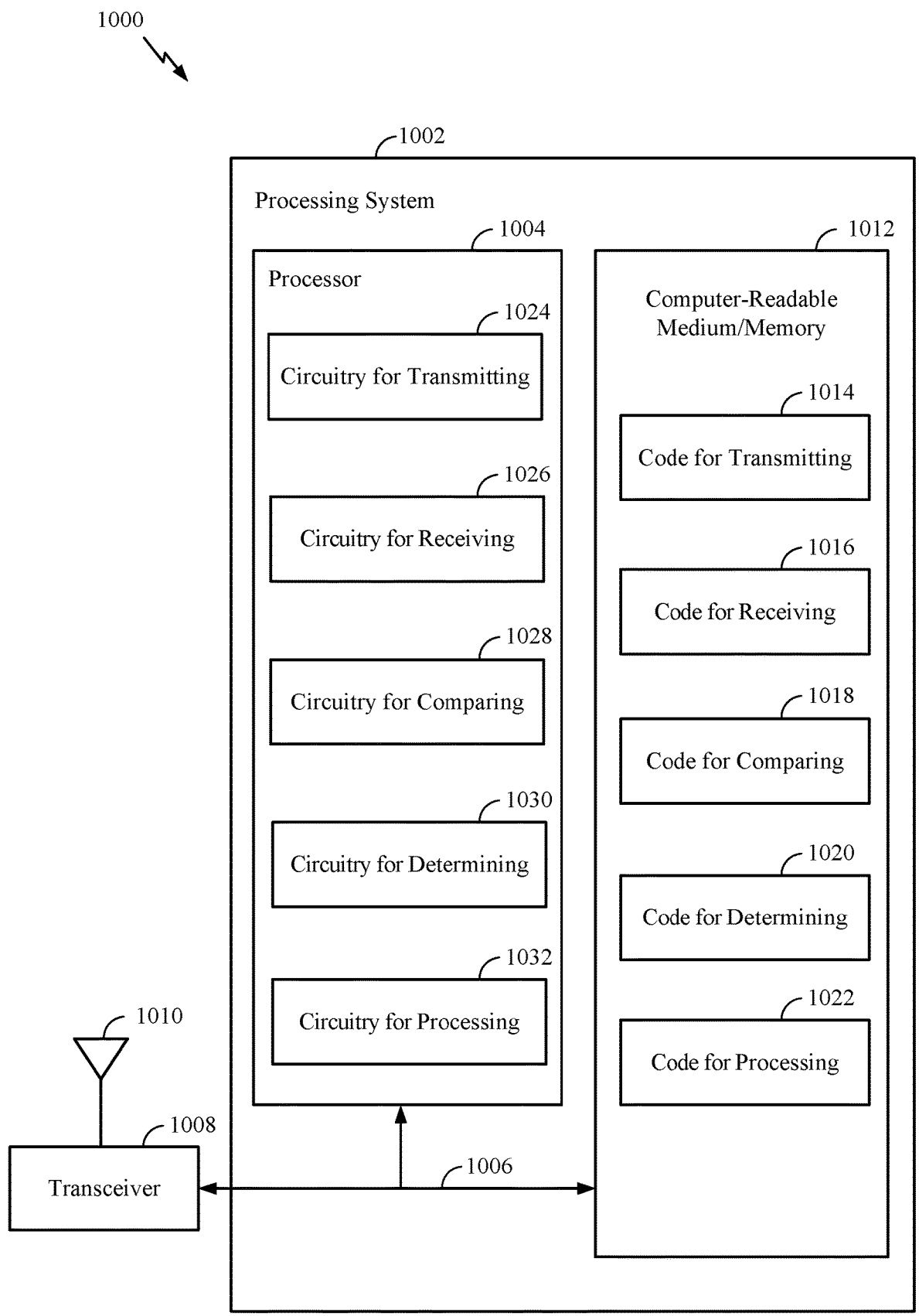
FIG. 10 illustrates a communications device (e.g., a UE) that may include various components configured to perform operations for the techniques disclosed herein in accordance with aspects of the present disclosure.

FIG. 10 illustrates a communications device 1000 (e.g., the UE 120) that may include various components (e.g., corresponding to means-plus-function components) configured to perform operations for the techniques disclosed herein, such as the operations illustrated in FIG. 5. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 5, or other operations for performing the various techniques discussed herein for downlink resource blanking. In certain aspects, computer-readable medium/memory 1012 stores code for transmitting 1014, code for receiving 1016, code for comparing 1018, code for determining 1020, and/or code for processing 1022. In certain aspects, the processor 1004 has circuitry configured to implement the code stored in the computer-readable medium/memory 1012. The processor 1004 includes circuitry for transmitting 1024, circuitry for receiving 1026, circuitry for comparing 1028, circuitry for determining 1030, and/or circuitry for processing 1032.

Figure 11:
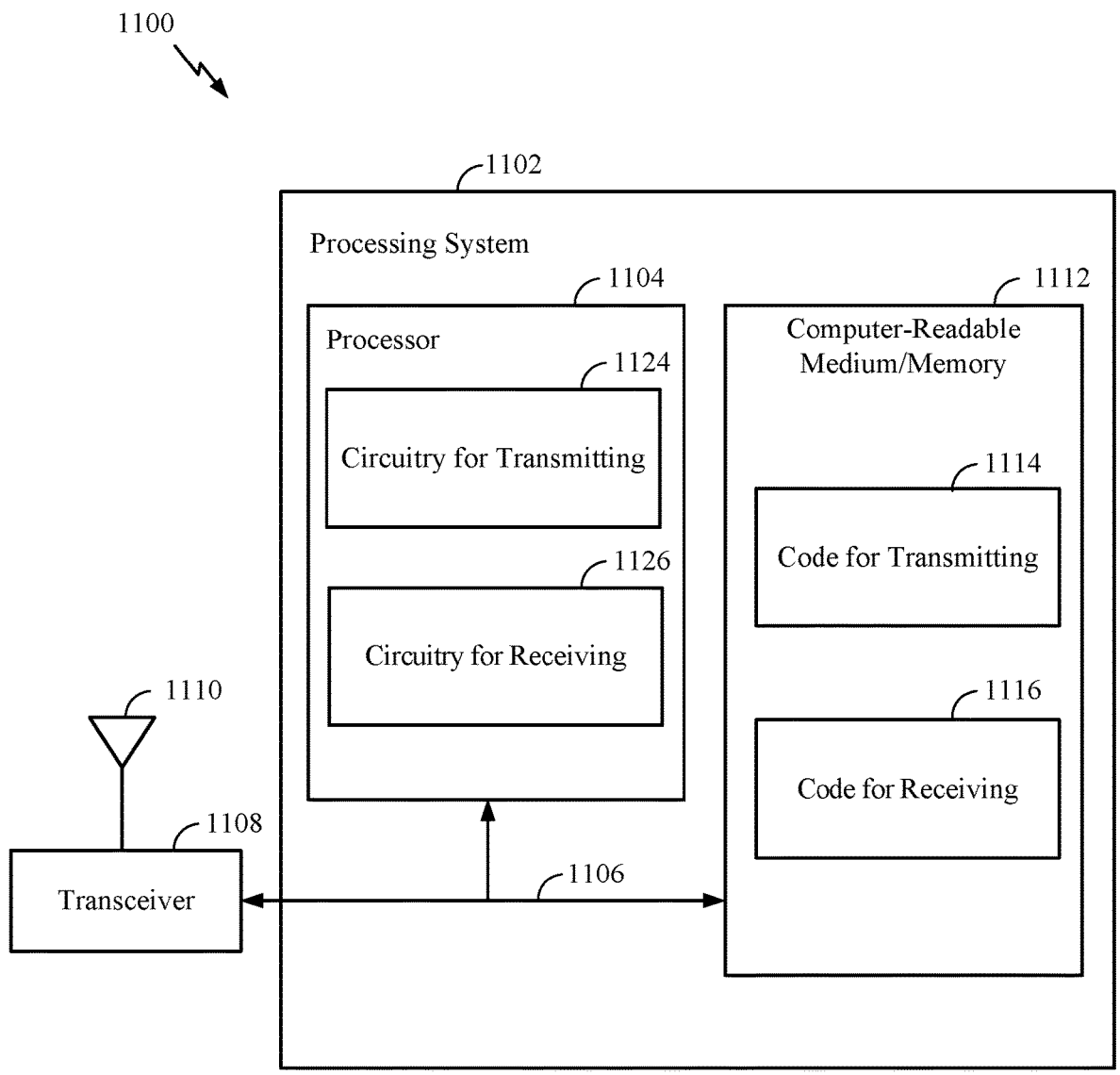
FIG. 11 illustrates a communications device (e.g., a serving cell) that may include various components configured to perform operations for the techniques disclosed herein in accordance with aspects of the present disclosure.

FIG. 11 illustrates a communications device 1100 (e.g., the BS 110 or serving cell 110f) that may include various components (e.g., corresponding to means-plus-function components) configured to perform operations for the techniques disclosed herein, such as the operations illustrated in FIG. 6. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 6, or other operations for performing the various techniques discussed herein for downlink resource blanking. In certain aspects, computer-readable medium/memory 1112 stores code for transmitting 1114 and/or code for receiving 1116. In certain aspects, the processor 1104 has circuitry configured to implement the code stored in the computer-readable medium/memory 1112. The processor 1104 includes circuitry for transmitting 1124 and/or circuitry for receiving 1126.

Example Aspects

In addition to the various aspects described above, specific combinations of aspects are within the scope of the disclosure, some of which are detailed below:

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting signals, an indication, or a message may comprise an antenna (e.g., the antennas 252, antennas 234, antenna 1010, or antenna 1110), a transceiver (e.g., the transceiver 254, transceiver 232, transceiver 1008, or transceiver 1108), a processor (e.g., the controller/processor 240 or controller/processor 280), code for transmitting (e.g., the code for transmitting 1014 or code for transmitting 1114), and/or circuitry for transmitting (e.g., the circuitry for transmitting 1024 or circuitry for transmitting 1124). Means for receiving signals or an indication may comprise an antenna (e.g., the antennas 252, antennas 234, antenna 1010, or antenna 1110), a transceiver (e.g., the transceiver 254, transceiver 232, transceiver 1008, or transceiver 1108), a processor (e.g., the controller/processor 240 or controller/processor 280), code for receiving (e.g., the code for receiving 1016 or code for receiving 1116), and/or circuitry for receiving (e.g., the circuitry for receiving 1026 or circuitry for receiving 1126). Means for comparing may comprise a processor (e.g., the controller/processor 280), code for comparing (e.g., the code for comparing 1018), and/or circuitry for comparing (e.g., the circuitry for comparing 1028). Means for determining may comprise a processor (e.g., the controller/processor 280), code for determining (e.g., the code for determining 1020), and/or circuitry for determining (e.g., circuitry for determining 1030). Means for processing may comprise a processor (e.g., the controller/processor 280), code for processing (e.g., the code for processing 1022), and/or circuitry for processing (e.g., the circuitry for processing 1032).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5 and/or FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication, comprising:
a memory; and
one or more processors coupled to the memory, the one or more processors, individually or collectively, and the memory being configured to:
receive one or more first signals from a first cell and one or more second signals from a second cell within a sampling window,
compare a first timing of the one or more first signals with a second timing of the one or more second signals, and
transmit, to the first cell, a first indication of whether to enable or disable blanking of one or more resources based on the comparison, wherein the first indication indicates to disable blanking of the one or more resources when a difference between the first timing and the second timing is less than or equal to a threshold.

2. The apparatus of claim 1, wherein the one or more processors and the memory are further configured to determine whether the difference between the first timing and the second timing is greater than or equal to the threshold, wherein the threshold is half of a cyclic prefix of an orthogonal frequency-division multiplexing (OFDM) symbol.

3. The apparatus of claim 1, wherein the one or more processors and the memory are further configured to process the one or more second signals based on the first timing of the one or more first signals.

4. The apparatus of claim 1, wherein:
the first indication indicates to enable blanking of the one or more resources when the difference between the first timing and the second timing is greater than the threshold.

5. The apparatus of claim 1, wherein the one or more processors and the memory are further configured to receive, from the first cell, a message indicating whether the one or more resources are blanked.

6. The apparatus of claim 5, wherein the one or more processors and the memory are further configured to:
receive one or more third signals from the second cell using the one or more resources, and
process the one or more third signals based on a timing of the one or more third signals and the comparison or the message indicating that the one or more resources are blanked from the first cell.

7. The apparatus of claim 5, wherein the one or more processors and the memory are further configured to:
receive one or more third signals from the first cell using the one or more resources based on the message indicating that the one or more resources are not blanked, and
process the one or more third signals based on a timing of the one or more third signals.

8. The apparatus of claim 1, wherein the one or more resources overlap with or are adjacent to at least one of one or more time-domain resources or one or more frequency-domain resources associated with a reference signal of the second cell.

9. An apparatus for wireless communication, comprising:
a memory; and
one or more processors coupled to the memory, the one or more processors, individually or collectively, and the memory being configured to:
receive one or more first signals from a first cell and one or more second signals from a second cell within a sampling window,
compare a first timing of the one or more first signals with a second timing of the one or more second signals, and
transmit, to the first cell, a first indication of whether to enable or disable blanking of one or more resources based on the comparison, wherein the first indication includes a second indication of the one or more resources and a flag indicating whether to enable or disable blanking of the one or more resources.

10. The apparatus of claim 9, wherein the second indication of the one or more resources includes an identifier corresponding to a plurality of resources or a plurality of identifiers corresponding to separate resources.

11. An apparatus for wireless communication, comprising:
a memory; and
one or more processors coupled to the memory, the one or more processors, individually or collectively, and the memory being configured to:
transmit one or more first signals to a user equipment (UE);
receive, from the UE and in response to the transmission of the one or more first signals, a first indication of whether to enable or disable blanking of one or more resources; and
transmit one or more second signals to the UE based on the first indication using the one or more resources when the first indication indicates to disable blanking of the one or more resources.

12. The apparatus of claim 11, wherein:
the one or more processors and the memory are further configured to transmit the one or more second signals using different resources than the one or more resources when the first indication indicates to enable blanking of the one or more resources.

13. The apparatus of claim 11, wherein:
the first indication includes a second indication of the one or more resources and a flag indicating whether to enable or disable blanking of the one or more resources; and
the second indication of the one or more resources includes an identifier corresponding to a plurality of resources or a plurality of identifiers corresponding to separate resources.

14. The apparatus of claim 11, wherein the one or more resources overlap with or are adjacent to at least one of one or more time-domain resources or one or more frequency-domain resources associated with a reference signal of a second cell.

15. An apparatus for wireless communication, comprising:
a memory; and
one or more processors coupled to the memory, the one or more processors, individually or collectively, and the memory being configured to:
transmit one or more first signals to a user equipment (UE);
receive, from the UE and in response to the transmission of the one or more first signals, a first indication of whether to enable or disable blanking of one or more resources;
transmit one or more second signals to the UE based on the first indication; and
transmit, to the UE, a message indicating whether the one or more resources are blanked.

16. A method of wireless communication by a user equipment, comprising:
receiving one or more first signals from a first cell and one or more second signals from a second cell within a sampling window;
comparing a first timing of the one or more first signals with a second timing of the one or more second signals; and
transmitting, to the first cell, a first indication of whether to enable or disable blanking of one or more resources based on the comparison, wherein the first indication indicates to disable blanking of the one or more resources when a difference between the first timing and the second timing is less than or equal to a threshold.

17. The method of claim 16, wherein comparing the first timing with the second timing comprises determining whether the difference between the first timing and the second timing is greater than or equal to the threshold, wherein the threshold is half of a cyclic prefix of an orthogonal frequency-division multiplexing (OFDM) symbol.

18. The method of claim 16, wherein:
the first indication indicates to enable blanking of the one or more resources, when the difference between the first timing and the second timing is greater than the threshold.

19. The method of claim 16, wherein:
the first indication includes a second indication of the one or more resources and a flag indicating whether to enable or disable blanking of the one or more resources;

the second indication of the one or more resources includes an identifier corresponding to a plurality of resources or a plurality of identifiers corresponding to separate resources; and the one or more resources overlap with or are adjacent to at least one of one or more time-domain resources or one or more frequency-domain resources associated with a reference signal of the second cell.

20. A method of wireless communication by a user equipment, comprising:

receiving one or more first signals from a first cell and one or more second signals from a second cell within a sampling window;

comparing a first timing of the one or more first signals with a second timing of the one or more second signals;

transmitting, to the first cell, a first indication of whether to enable or disable blanking of one or more resources based on the comparison; and receiving, from the first cell, a message indicating whether the one or more resources are blanked.

21. The method of claim 20, further comprising:

receiving one or more third signals from the second cell using the one or more resources; and processing the one or more third signals based on a timing of the one or more third signals and the comparison or the message indicating that the one or more resources are blanked from the first cell.

22. The method of claim 20, further comprising:

receiving one or more third signals from the first cell using the one or more resources based on the message indicating that the one or more resources are not blanked; and processing the one or more third signals based on a timing of the one or more third signals.

23. A method of wireless communication by a network entity, comprising:

transmitting one or more first signals to a user equipment (UE);

receiving, from the UE and in response to the transmission of the one or more first signals, a first indication of whether to enable or disable blanking of one or more resources; and transmitting one or more second signals to the UE based on the first indication using the one or more resources when the first indication indicates to disable blanking of the one or more resources.

24. The method of claim 23, wherein: further comprising:

transmitting the one or more resources using different resources than the one or more resources when the first indication indicates to enable blanking of the one or more resources.

25. The method of claim 23, wherein:

the first indication includes an indication of the one or more resources and a flag indicating whether to enable or disable blanking of the one or more resources;

the method further comprises receiving a second indication including an identifier corresponding to a plurality of resources or a plurality of identifiers corresponding to separate resources; and the one or more resources overlap with or are adjacent to at least one of one or more time-domain resources or one or more frequency-domain resources associated with a reference signal of a second cell.

26. A method of wireless communication by a network entity, comprising:

transmitting one or more first signals to a user equipment (UE);

receiving, from the UE and in response to the transmission of the one or more first signals, a first indication of whether to enable or disable blanking of one or more resources;

transmitting one or more second signals to the UE based on the first indication; and transmitting, to the UE, a message indicating whether the one or more resources are blanked.

* * * * *